US009438157B2

(12) United States Patent
Adam et al.

(10) Patent No.: US 9,438,157 B2
(45) Date of Patent: Sep. 6, 2016

(54) METHOD FOR OPERATING A MULTIPHASE ELECTRIC MACHINE AND CORRESPONDING MULTIPHASE ELECTRIC MACHINE

(71) Applicant: AUDI AG, Ingolstadt (DE)

(72) Inventors: Martin Adam, Meissen (DE); Marcel Kuhn, Kist (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/778,817

(22) PCT Filed: Mar. 14, 2014

(86) PCT No.: PCT/EP2014/000701
§ 371 (c)(1),
(2) Date: Sep. 21, 2015

(87) PCT Pub. No.: WO2014/146772
PCT Pub. Date: Sep. 25, 2014

(65) Prior Publication Data
US 2016/0043676 A1    Feb. 11, 2016

(30) Foreign Application Priority Data

Mar. 22, 2013  (DE) .................. 10 2013 004 954

(51) Int. Cl.
*H02P 21/00*  (2016.01)
*H02P 6/16*  (2016.01)
(Continued)

(52) U.S. Cl.
CPC ............ *H02P 21/0035* (2013.01); *H02P 6/14* (2013.01); *H02P 6/16* (2013.01); *H02P 6/182* (2013.01)

(58) Field of Classification Search
CPC ............ H02P 21/00; H02P 6/14; H02P 6/16; H02P 6/182
USPC .............. 318/400.02, 721, 724, 400.05, 449, 318/605, 637, 661
See application file for complete search history.

(56) References Cited

U.S. PATENT DOCUMENTS 6,806,670 B2   10/2004 Kusaka
6,979,975 B1 * 12/2005 Kinpara ............... G01P 3/44
                                               318/400.02
(Continued)

FOREIGN PATENT DOCUMENTS

DE       103 20 126 A1   12/2003
DE   10 2008 001 408 A1   10/2009
(Continued)

OTHER PUBLICATIONS

International Search Report issued by the European Patent Office in International Application PCT/EP2014/000701.

*Primary Examiner* — Rita Leykin
(74) *Attorney, Agent, or Firm* — Henry M. Feiereisen LLC

(57) ABSTRACT

In a method for operating a multiphase electrical machine, which includes a rotor and a rotary encoder operatively connected to the rotor, an actual rotational angle of the rotor is determined from a measured rotational angle determined by means of the rotary encoder and a rotational angle offset. To determine the rotational angle offset the rotor is brought to a specific rotational speed and then an active short circuit of the electrical machine is initiated, wherein an actual current vector is determined, using a dq-transformation, from the current intensities of the currents flowing in at least two of the phases of the electrical machine and the measured rotational angle determined by means of the rotary encoder, and wherein the rotational angle offset is calculated from the actual current vector and a reference current vector.

11 Claims, 2 Drawing Sheets

(51) Int. Cl.
*H02P 6/18* (2016.01)
*H02P 6/14* (2016.01)

(56) References Cited

U.S. PATENT DOCUMENTS

| | | | | |
|---|---|---|---|---|
| 7,199,538 B2* | 4/2007 | Kameya | ............... | B62D 5/046 |
| | | | | 180/443 |
| 7,486,043 B2* | 2/2009 | Atarashi | ............ | H02P 21/0089 |
| | | | | 318/494 |
| 7,548,038 B2* | 6/2009 | Atarashi | ............ | H02P 21/0089 |
| | | | | 318/494 |
| 7,583,048 B2* | 9/2009 | Atarashi | ............... | H02P 21/08 |
| | | | | 318/34 |
| 7,622,883 B2* | 11/2009 | Kaizuka | ............ | H02P 21/0003 |
| | | | | 318/721 |
| 7,745,949 B2* | 6/2010 | Yang | ............... | H02P 9/009 |
| | | | | 290/44 |
| 7,830,106 B2* | 11/2010 | Fukuchi | ............... | H02P 21/22 |
| | | | | 318/400.02 |
| 8,421,385 B2* | 4/2013 | Bohm | ............... | B62D 5/008 |
| | | | | 318/363 |
| 8,441,219 B2* | 5/2013 | Li | ............... | H02P 5/46 |
| | | | | 318/400.02 |
| 9,083,276 B2* | 7/2015 | Yamada | ............... | H02K 21/042 |
| 2014/0055068 A1 | 2/2014 | Trautmann et al. | | |

FOREIGN PATENT DOCUMENTS

| | | |
|---|---|---|
| DE | 10 2010 017 411 A1 | 12/2011 |
| DE | 10 2011 089 341 A1 | 7/2012 |
| DE | 10 2012 201 319 A1 | 8/2012 |
| JP | 2007-318894 A | 12/2007 |

* cited by examiner

METHOD FOR OPERATING A MULTIPHASE ELECTRIC MACHINE AND CORRESPONDING MULTIPHASE ELECTRIC MACHINE

CROSS-REFERENCES TO RELATED APPLICATIONS

This application is the U.S. National Stage of International Application No. PCT/EP2014/000701, filed Mar. 14, 2014, which designated the United States and has been published as International Publication No. WO 2014/146772 and which claims the priority of German Patent Application, Serial No. 10 2013 004 954.7, filed Mar. 22, 2013, pursuant to 35 U.S.C. 119(a)-(d).

BACKGROUND OF THE INVENTION

The invention relates to a method for operating a multiphase electric machine which has a rotor and a rotary encoder, which is connected to the rotor, wherein an actual rotation angle of the rotor is determined from a measured rotation angle determined by the rotary encoder and a rotation angle offset. The invention also relates to a multiphase electric machine.

Many applications require to control the (multiple) phases of the electric machine—which for example is constructed as synchronous machine—in dependence on the currently present actual rotation angle of the rotor. Correspondingly it is required to determine the actual rotation angle with high accuracy. For this purpose the rotary encoder is provided. However, because it is oftentimes not possible to first bring the rotor into a exactly defined position and to subsequently connect the rotary encoder with the rotor, the rotary encoder can only provide the measured rotation angle, which however depending on the rotation angle of the rotor during mounting of the rotary encoder of the rotor deviates from the actual rotation angle by the rotation angle offset.

This rotation angle offset must therefore be determined in order to determine the actually present actual rotation angle of the rotor. One possibility is for example to measure the phase voltages that are present in the phases of the electric machine, because the phase angle of these phase voltages can provide an indication of the actual rotation angle of the rotor. For this purpose it would have to be possible to measure these phase voltages, which, however, oftentimes is not the case. This applies in particular when the electric machine is used for driving a hybrid or electric vehicle. The power electronics used in this case for controlling the individual phases of the electric machine in most cases simply do not offer the possibility to determine the phase voltages. From the state of the art for example the published patent application DE 2011 089 341 A1 is known. This published patent application discloses a method for determining an angle between a stator and a rotor of a externally excited synchronous machine.

SUMMARY OF THE INVENTION

It is an object of the invention to propose a method for operating a multiphase electric machine, in which the actual angle of the rotor can be determined with high accuracy in a simple manner, in particular without storing and/or downloading expansive reference data that are determined on a test stand.

According to the invention this is solved with a method with the features of the independent method claim. It is provided that for determining the rotation angle offset the rotor is brought to a defined rotational speed and then an active short circuit of the electric machine is induced, wherein the actual current vector is determined from the current strengths of the currents that flow in at least two of the phases of the electric machine and the measured rotation angle is determined with the rotary encoder by means of a dq-transformation, and wherein the rotation angle offset is calculated from the actual current vector and a reference current vector. The method thus is based on the measurement of the phase currents in the active short circuit. Hereby the rotor is first operated with a defined direction of rotation and is brought to a defined rotational speed. For this purpose for example the rotary encoder is used by means of which the currently present rotational speed of the rotor can be determined with high accuracy. In particular the actual rotational speed is adjusted to the defined rotational speed by means of the rotary encoder.

After the rotor reaches the defined rotational speed the active short circuit of the machine is induced. For this purpose for example all high-side-switches or all low-side-switches of an inverter that is used for controlling the phases of the electric machine are closed. Then the current strengths of the currents that flow in at least two of the phases of the electric machine are determined. For this purpose for example a controller of the electric machine has corresponding means. The current strengths can be determined directly after inducing the active short circuit or as an alternative after expiration of a defined period of time, which starts with the induction of the active short circuit. The time period is hereby preferably selected so that an transient oscillation of the electric machine has already taken place so that insofar steady courses of the current strengths are expected. The current strengths are in particular measured simultaneously. In addition the measured rotation angle is determined, in particular also simultaneously, by means of the rotary encoder.

From the current strength determined in this way and the measured rotation angles (i.e., not the actual rotation angle of the rotor) the actual current vector is determined by performing a dq-transformation. The dq-transformation can also be referred to as Park-transformation. It serves for transforming multiphase, in particular three-phase, variables into a two-axes coordinate system with the axes d and q. The dq-coordinate system formed by the axes d and q rotates in the stationary state of the rotor so that the actual current vector remains constant at least over a defined period of time and/or when the rotational speed of the rotor is constant and thus represents a constant value.

Subsequently this actual current vector is compared with the reference current vector, and the rotation angle offset is calculated from the two variables. The rotation angle offset is then preferably used for determining the actual rotation angle from the measured rotation angle. Correspondingly it is the possible after the aforementioned determination of the rotation angle offset, to determine the currently present actual rotation angle of the rotor with high accuracy. This enables a reliable operation of the electric machine based in the actual rotation angle.

Generally, different procedures are available for determining the reference current vector. For example the reference current vector is already present, i.e., it is stored in the electric machine or in a control device of the electric machine. However, it can also be determined during the determining of the rotation angle offset. The different possibilities for determining the reference current vector explained below are not exclusive. Beside the described possibilities other possibilities may exist.

In a refinement of the invention the actual current vector is determined in a first direction of rotation of the rotor and the reference current vector is determined analogously to the first current vector in a second direction of rotation opposite to the first direction of rotation. The procedure for determining the actual current vector was described above. Hereby the rotor is first brought to a defined rotational speed and then the active short circuit is induced. Subsequently the current strengths of the currents flowing in at least two of the phases of the electric machine and the measured rotation angle are determined. From these variables the actual current vector is determined by means of the dq-transformation. Hereby the first direction of rotation of the rotor is present. For determining the reference current vector, an analogous procedure is followed with the difference that in this case the second direction of rotation is present.

Thus first (prior to or during the determination of the rotation angle offset according to the description above) the rotor is brought to the defined rotational speed in the second direction of rotation and again the active short circuit is induced. Subsequently the current strengths of the currents flowing in at least two of the phases of the electric machine and the measured rotation angle are determined and from these variables the reference current vector is determined by using the dq-transformation. Subsequently the rotation angle offset is determined as described above. Particularly preferably, the same rotational speed is provided when determining the reference current vector as when determining the actual current vector, wherein however different directions of rotation are present.

A further embodiment of the invention provides that the rotation angle offset is determined by adding the angle of the reference current vector and a reference angle, wherein the differential angle corresponds to half of the angle difference between the actual current vector and the reference current vector. In the case of preferably identical operating points, i.e., the same rotational speed, however opposite directions of rotation, the d-component of the current strengths ideally remains constant in the dq-coordinate system for the actual current vector and the reference current vector, while the q-component of the reference current vector is negated compared to the actual current vector. When the actual current vector and the reference current vector is not determined with the measured rotation angle but with the actual rotation angle when the rotational angle offset is already determined, the angle bisector of the actual current vector and the reference current vector are on the d-axis of the dq-coordinate system. Knowing this relationship, the rotation angle offset can now be determined in a simple manner.

For this purpose the differential angle is first determined, which corresponds to half of the angle difference between the angle of the actual current vector and the angle of the reference current vector. The term angle hereby means for example the angle between the respective vector and the d-axis, in particular the negative d-axis of the dq-coordinate system. Essentially, thus in particular the smaller angel difference between the two vectors, i.e., the actual current vector and the reference current vector, is determined and halved so that the differential angle results. The thusly determined differential is added to the angle of the reference current vector. The result is the rotation angle offset between the measured rotation angle and the actual rotation angle of the rotor.

In a preferred embodiment of the invention it is provided that the rotational angle offset is determined by the equation $$\theta_{Offset} = \frac{1}{2}\arctan\left(\frac{I_{1,q}I_{2,d} - I_{1,d}I_{2,q}}{I_{1,d}I_{2,d} - I_{1,q}I_{2,q}}\right) + \arctan\left(\frac{I_{2,q}}{I_{2,d}}\right) - 180°$$

wherein $I_{1,q}$ is the q-component and $I_{1,d}$ is the d-component of the actual current vector and $I_{2,q}$ is the q-component and $I_{2,d}$ the d-component of the reference current vector. It can be seen that only a small number of variables have to be stored to determine the rotation angle offset, in particular the q-components and the d-components of the actual current vector and the reference current vector. Further variables are not required, in particular no characteristic diagram or the like has to be provided in which multiple reference values of a reference machine are stored.

In a particularly preferred embodiment of the invention the reference current vector is determined in dependence on the rotational speed of the rotor from stored reference data. This is the second embodiment described in this application. While in the first embodiment described above it was necessary to induce the electric short circuit twice in the electric machine, wherein opposite directions of rotation have to be present, it is sufficient in the second embodiment to induce an active short circuit only once and thus determine the actual current vector. The reference current vector is then determined in dependence on the rotational speed of the rotor, which is in particular determined by means of the rotary encoder. For this purpose reference data are stored at least for the defined rotational speed provided during the determination of the rotation angle offset, which reference data were for example determined by means of a reference machine on a test stand. Of course it can also be provided to store such reference data for multiple rotational speeds of the rotor. In this case a rotational speed can be selected from this plurality of rotational speeds for the determination of the rotation angle offset, which is adjusted to the operating conditions. Preferably the reference data are however only stored for a single rotational speed to keep the amount of data as small as possible. The active short circuit is in this case induced at this rotational speed.

In a further embodiment it is for example provided that the rotation angle offset is determined by subtracting the angle of the actual current vector and the angle of the reference current vector. The determination of the angles was described above. Here it can for example be provided that the angle is present between the respective vector and the d-axis of the dq-coordinate system, in particular the positive d-axis.

In a further embodiment it can be provided that the rotation angle offset is determined by means of the equation $$\theta_{Offset} = \arctan\left(\frac{I_{2,q}}{I_{2,d}}\right) - \arctan\left(\frac{I_{1,q}}{I_{1,d}}\right)$$

wherein $I_{1,q}$ is the q-component and $I_{1,d}$ is the d-component of the actual current vector and $I_{2,q}$ and is the q-component and $I_{2,d}$ the d-component of the reference current vector. When the measured rotation angle does not correspond to the actual rotation angle of the rotor, i.e., when the rotation angle offset has a value of more than 0°, the actual current vector and the reference current vector do not coincide, while this is the case when no deviation between the actual rotation angle and the measured rotation angle is present. Correspondingly only the angle difference between the actual current vector and the reference current vector has to be determined in order to obtain the rotation angle offset. This can be accomplished by means of the above-mentioned equation, wherein this also makes clear that only a small amount of data is required and the equation is very simple. Correspondingly a reliable determination of the rotation angle offset and thus a subsequent accurate determination of the actual rotation angle of the rotor requires only a small amount of storage capacity and processing capacity.

When merely a reference angle is stored in the form of the reference data, the relationship $$\theta_{Offset} = \theta_{Ref} - \arctan\left(\frac{I_{1,q}}{I_{1,d}}\right)$$

can also be used, wherein $\theta_{Ref}$ is the reference angle.

A refinement of the invention provides that the rotation angle offset is corrected in dependence on the temperature. The currents in the active short circuit are strongly dependent on the currently present temperature. Correspondingly, errors may result in the determination of the rotation angle offset, when the temperature is not taken into account. The error results in particular when the rotation angle offset is determined at a temperature which deviates from the temperature at which the reference current vector is determined.

Particularly preferably it is provided that the correcting is preformed with the correction parameter $$k(\omega, \vartheta) = \arctan\left(\frac{\omega L_S (R_{Ref} - R_S(\vartheta))}{R_{Ref} R_S(\vartheta) + \omega L_S^2}\right)$$

wherein $\omega$ is the angular Ref velocity of the rotor, $L_S$ the stator inductivity, $R_{Ref}$ a reference resistance and $R_S$ the actual resistance of the stator. In order to determine the correction parameter k, thus the variable values of at least the angular velocity $\omega$ and the actual resistance $R_S$ of the stator are required. The correction parameter also depends on the temperature $\square$ or a variable that depends on this temperature, such as for example the actual resistance of the stator of the reference machine at a defined temperature. The correction parameter is present in the form of an angle, which is subtracted from the rotation angle offset determined according to the above description.

The equation above can be simplified for the correction parameter k because at high rotational speeds the following relationship applies:

$$R_{Ref} R_S(\theta) << \omega^2 L_S^2.$$

When for example the reference data are stored at a reference temperature $T_{Ref}$, the following relationship results for the equation of the correction parameter:

$$k(\omega, \vartheta) = \arctan\left(-(\vartheta - T_{Ref})\frac{R_{Ref} * \alpha}{\omega L_S}\right).$$

Hereby $R_{Ref}$ is the reference resistance at the reference temperature $T_{Ref}$, $\alpha$ the resistance coefficient of a coil material of the electric machine, in particular of the rotor, and $\square$ the current temperature.

The invention also relates to a multiphase electric machine, in particular for performing the method described above, which has a rotor and a rotary encoder connected with the rotor, wherein it is provided to determine an actual rotation angle of the rotor from a measured rotation angle determined with the rotary encoder and a rotation angle offset. Hereby, for determining the rotation angle offset, the electric machine is configured to bring the rotor to a defined rotational speed and to then induce an active short circuit of the electric machine, wherein an actual current vector is determined from the current strengths of currents flowing in at least two of the phases of the electric machine, and the measured rotation angle is determined with the rotary encoder by means of a dq-transformation, and wherein the rotation angle offset is calculated from the actual current vector and a reference current vector. The advantages of such a configuration of the electric machine and the corresponding procedure has been described above. The electric machine and the corresponding method can be refined according to the description above so that reference is made to this description.

BRIEF DESCRIPTION OF THE DRAWING

In the following the invention is described in more detail by way of the exemplary embodiments shown in the drawing without limiting the invention. It is shown in.

DETAILED DESCRIPTION OF PREFERRED EMBODIMENTS

Figure 1:
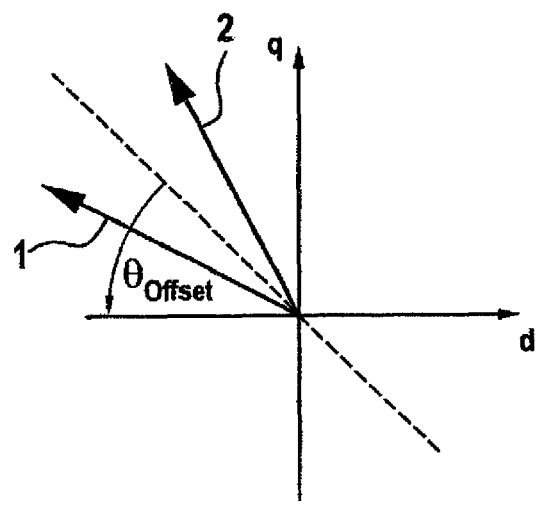
FIG. 1 a first diagram for a dq-coordinate system, in which an actual current vector and a reference current vector are plotted, wherein an actual rotation angle of a rotor of an electric machine deviates from a measured rotation angle determined by means of the rotary encoder, FIG. 2 the diagram of FIG. 1, wherein however the actual rotation angle corresponds to the measured rotation angle, or the actual rotation angle is corrected by means of a rotation angle offset, and FIG. 3 a further diagram in which an actual current vector and a reference current vector are plotted on in a dq-coordinate system.
Figure 2:
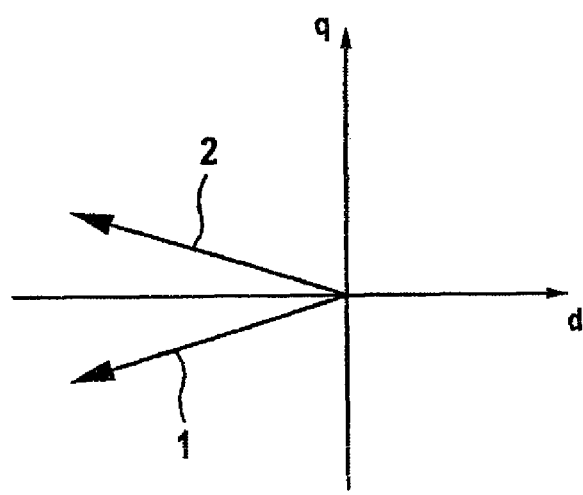
Figure 3:
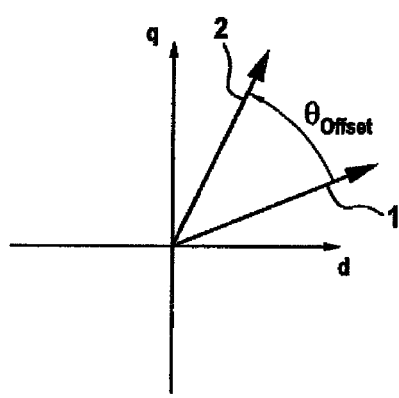

FIGS. 1 to 3 illustrate a method for operating a multiphase electric machine, which has a rotor and a rotary encoder coupled with the rotor. By means of the rotary encoder a measured rotation angle is detected, from which subsequently the actual rotation angle of the rotor is determined by using a rotation angle offset. This is in particular required because during mounting of the rotary encoder to the rotor or during generating an operative connection between these two elements often times no defined position of the rotor is present. Thus the measured rotation angle measured by means of the rotary encoder does not correspond to the actual rotation angle of the rotor. During a calibration, the rotation angle offset therefore has to be determined. The rotation angle offset represents a difference between the measured rotation angle and the actual rotation angle. In particular the actual rotation angle is thus determined by forming the sum between the measured rotation angle and the rotation angle offset.

In the determination of the rotation angle offset it is provided to first bring the rotor to a defined rotational speed $\omega$, wherein a first direction of rotation is present. Subsequently an active short circuit of the electric machine is induced. During the active short circuit, current strengths of currents flowing in at least two of the phases of the electric machine are detected and additionally the measured rotation angle that was determined by means of the rotary encoder. From the current strengths and the measured rotation angle an actual current vector is determined by means of a dq-transformation, which actual current vector is positionally fixed relative to the rotor, i.e., rotates together with the rotor. By using a reference current vector and the actual current vector the rotation angle offset is determined and subsequently the electric machine is operated with a corrected actual rotation angle.

FIG. 1 shows a diagram in which an actual current vector 1 as well as a reference current vector 2 are plotted in a dq-coordinate system. It can be seen that the rotation angle offset $\theta_{Offset}$ corresponds to an angle bisector between the reference current vector 2 and the actual current vector 1 or their angular distance to a negative d-axis of the dq-coordinate system.

This is further illustrated by FIG. 2. While in the case illustrated in FIG. 1 the rotation angle offset $\theta_{offset}$ is greater than 0°, the rotation angle offset $\theta_{Offset}$ equals 0°. This means that the actual rotation angle corresponds to the measured rotation angle. In this case the angle bisector of the actual current vector 1 and the reference current director 2 are situated on the negative d-axis. This circumstance is now utilized for determining the rotation angle offset by first operating the electric machine in a first direction of rotation and subsequently at a second direction of rotation opposite to the first direct of rotation. In an active short-circuit the actual contractor 1 is determined in the first direction of rotation and the reference current vector 2 is determined in the second direction of rotation. Subsequently a reference angle is determined which corresponds to half of the angle difference between the actual current vector 1 and reference current vector 2. The rotation angle offset is now determined by adding the angle reference current vector 2 and the reference angle.

FIG. 3 describes a further embodiment of the method for operating the electric machine. Here the actual current vector 1 is determined at a defined direction of rotation. The reference current vector or a reference angle is stored in the form of reference data in dependence on the rotational speed of the electric machine. By means of this stored reference current vector 2 and from the actual current director 1 determined from the measuring data the rotation angle offset can be determined, in particular by subtracting the angle of the actual current vector 1 from the angle of the reference current vector 2.

What is claimed is:

1. A method for operating a multiphase electric machine, having a rotor and a rotary encoder operatively connected with the rotor, comprising:
   bringing the rotor to a defined rotational speed;
   measuring a measured rotation angle of the rotor with the rotary encoder,
   inducing an active short circuit of the electric machine;
   measuring current strengths of currents that flow in at least two phases of the electric machine in the induced active short circuit;
   determining an actual current vector from the current strengths and the measured rotation angle by using a dq-transformation;
   calculating a rotation angle offset from the actual current vector and a reference current vector; and
   determining an actual rotation angle of the rotor as a function of the measured rotation angle and the rotation angle offset.

2. The method of claim 1, wherein the actual current vector is determined in a first direction of rotation of the rotor and the reference current vector is determined analogous to the actual current vector in a second direction of rotation that is opposite to the first direction of rotation.

3. The method of to claim 1, wherein the rotation angle offset is determined by adding an angle of the reference current vector and a differential angle, said differential angle corresponding to half of an angular difference between the actual current vector and the reference current vector.

4. The method of claim 1, wherein the rotation angle offset is determined with the equation:

$$\theta_{Offset} = \frac{1}{2}\arctan\left(\frac{I_{1,q}I_{2,d} - I_{1,d}I_{2,q}}{I_{1,d}I_{2,d} - I_{1,q}I_{2,q}}\right) + \arctan\left(\frac{I_{2,q}}{I_{2,d}}\right) - 180°$$

wherein $I_{1,q}$ is a q-component and $I_{1,d}$ is a d-component of the actual current vector, and $I_{2,q}$ is a q-component and $I_{1,d}$ a d-component of the reference current vector.

5. The method of claim 1, wherein the reference current vector is determined from stored reference data in dependence on the rotational speed of the rotor.

6. The method of claim 1, wherein the rotation angle offset is determined by subtracting the angle of the actual current vector and the angle of the reference current vector.

7. The method of claim 1, wherein the rotation angle offset is determined with the equation $$\theta_{Offset} = \arctan\left(\frac{I_{2,q}}{I_{2,d}}\right) - \arctan\left(\frac{I_{1,q}}{I_{1,d}}\right)$$

wherein $I_{1,q}$ is a q-component and $I_{1,d}$ is a d-component of the actual current vector and $I_{2,q}$ is a q-component and $I_{2,d}$ a d-component of the reference current vector.

8. The method of claim 1, wherein the rotation angle offset is determined in dependence on a temperature.

9. The method of claim 1, further comprising correcting the rotation angle offset with a correction parameter, said correction parameter being determined with the relationship $$k(\omega, \vartheta) = \arctan\left(\frac{\omega L_S (R_{Ref} - R_S(\vartheta))}{R_{Ref} R_S(\vartheta) + \omega L_S^2}\right)$$

wherein $\omega$ is an angular velocity of the rotor, $L_S$ is a stator inductivity, $R_{Ref}$ is reference resistance and $R_S$ is an actual resistance of the stator.

10. A multiphase electric machine, comprising:
   a rotor and a rotary encoder operatively coupled with the rotor, said electric machine being configured
   to bring the rotor to a defined rotational speed;
   to measure a measured rotation angle of the rotor with the rotary encoder,
   to induce an active short circuit of the electric machine;
   to measure current strengths of currents that flow in at least two phases of the electric machine in the induced active short circuit;
   to determine an actual current vector from the current strengths and the measured rotation angle by using a dq-transformation;
   to calculate a rotation angle offset from the actual current vector and a reference current vector; and
   to determining an actual rotation angle of the rotor as a function of the measured rotation angle and the rotation angle offset.

11. The multiphase electric machine configured for implementing the method of claim 1.

* * * * *